(12) United States Patent
Katsuyama

(10) Patent No.: US 11,679,775 B2
(45) Date of Patent: Jun. 20, 2023

(54) VEHICLE CONTROL APPARATUS

(71) Applicant: Toyota Jidosha Kabushiki Kaisha, Toyota (JP)

(72) Inventor: Etsuo Katsuyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 17/376,533

(22) Filed: Jul. 15, 2021

(65) Prior Publication Data
US 2022/0024464 A1   Jan. 27, 2022

(30) Foreign Application Priority Data

Jul. 22, 2020  (JP) .............................. JP2020-125484

(51) Int. Cl.
*B60W 40/09*  (2012.01)
*B60W 40/13*  (2012.01)
*B60W 40/107*  (2012.01)

(52) U.S. Cl.
CPC ............ *B60W 40/13* (2013.01); *B60W 40/09* (2013.01); *B60W 40/107* (2013.01); *B60W 2040/1315* (2013.01)

(58) Field of Classification Search
CPC .... B60W 40/13; B60W 40/09; B60W 40/107; B60W 2040/1315
See application file for complete search history.

(56) References Cited

U.S. PATENT DOCUMENTS

2007/0055432 A1*  3/2007  Koibuchi ............... B60W 40/11
                                                   701/72
2007/0058892 A1*  3/2007  Motohashi ............ F16C 19/186
                                                   384/448

(Continued)

FOREIGN PATENT DOCUMENTS

CN           103448716 A       12/2013

OTHER PUBLICATIONS

Allen et al., "Estimation of Passenger Vehicle Inertial Properties and Their Effect on Stability and Handling", SAE Transactions, 2003, vol. 112, Section 6: Journal of Passenger Car: Mechanical Systems Journal (2003), pp. 1032-1050 (Year: 2003).*

*Primary Examiner* — Yazan A Soofi
*Assistant Examiner* — Naeem Taslim Alam
(74) *Attorney, Agent, or Firm* — Dinsmore & Shohl LLP

(57) ABSTRACT

A vehicle control apparatus comprising, a center of gravity six-component calculation unit for calculating a center of gravity six-component as vehicle motion targets based on a driver input, a tire three-component calculation unit for calculating a tire three-component of four wheels of a vehicle based on the center of gravity six-component, a vehicle control unit for performing vehicle control by the vehicle control, actuator group based on the tire three-component of the four wheels, and wherein the tire three-component calculation unit calculates the tire three-component of the four wheels from the center of gravity six-component by a coordinate transformation without repetition, which is normalization with the driving stiffness of each wheel and the cornering stiffness of each wheel, when the number of control requests in the vehicle control is less than degrees of freedom of the vehicle control actuator group.

4 Claims, 7 Drawing Sheets

(56) References Cited

U.S. PATENT DOCUMENTS

| | | | | |
|---|---|---|---|---|
| 2008/0013873 | A1* | 1/2008 | Ishii | F16C 33/723 |
| | | | | 384/448 |
| 2013/0218388 | A1* | 8/2013 | Katsuyama | B60L 50/51 |
| | | | | 701/22 |
| 2015/0100205 | A1* | 4/2015 | Katsuyama | B60W 30/045 |
| | | | | 701/37 |
| 2015/0274033 | A1* | 10/2015 | Katsuyama | B60L 7/26 |
| | | | | 701/22 |
| 2016/0304100 | A1* | 10/2016 | Tan | B60W 40/12 |
| 2017/0102293 | A1* | 4/2017 | Singh | B60W 40/12 |
| 2019/0126976 | A1* | 5/2019 | Murayama | B60W 40/114 |
| 2019/0283733 | A1* | 9/2019 | Takei | B60G 17/0195 |

* cited by examiner

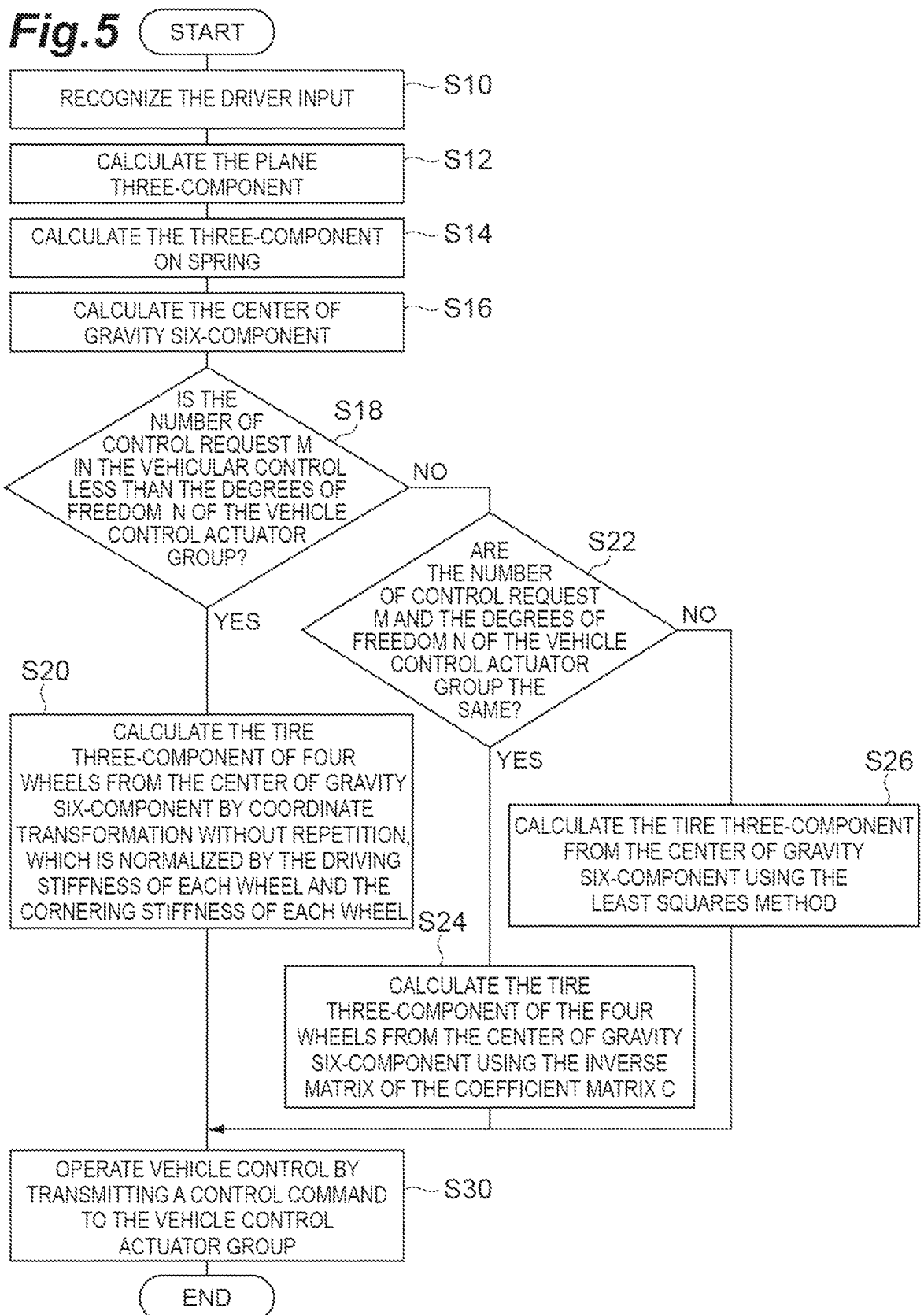

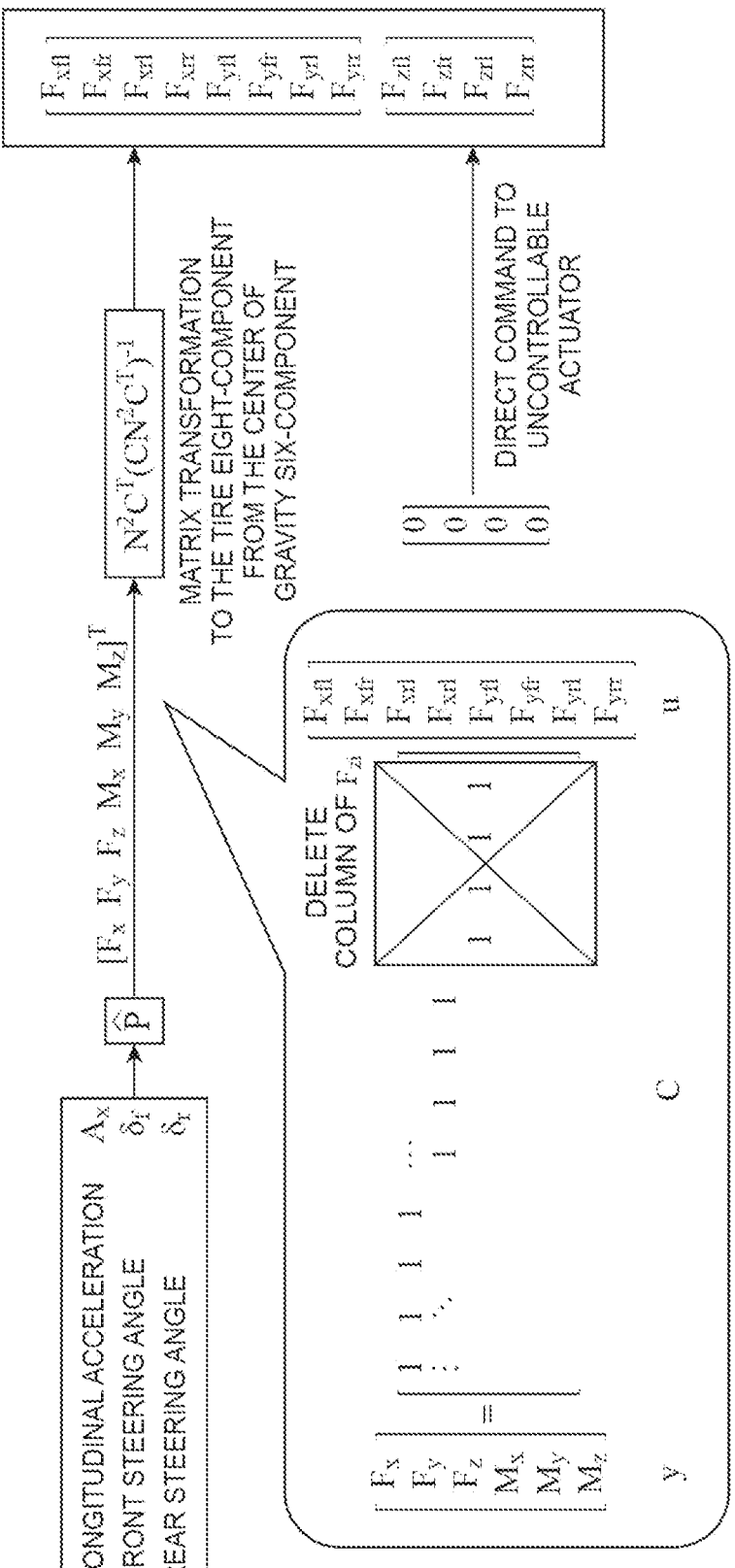
Fig.6 CASE OF NO ACTIVE SUSPENSION

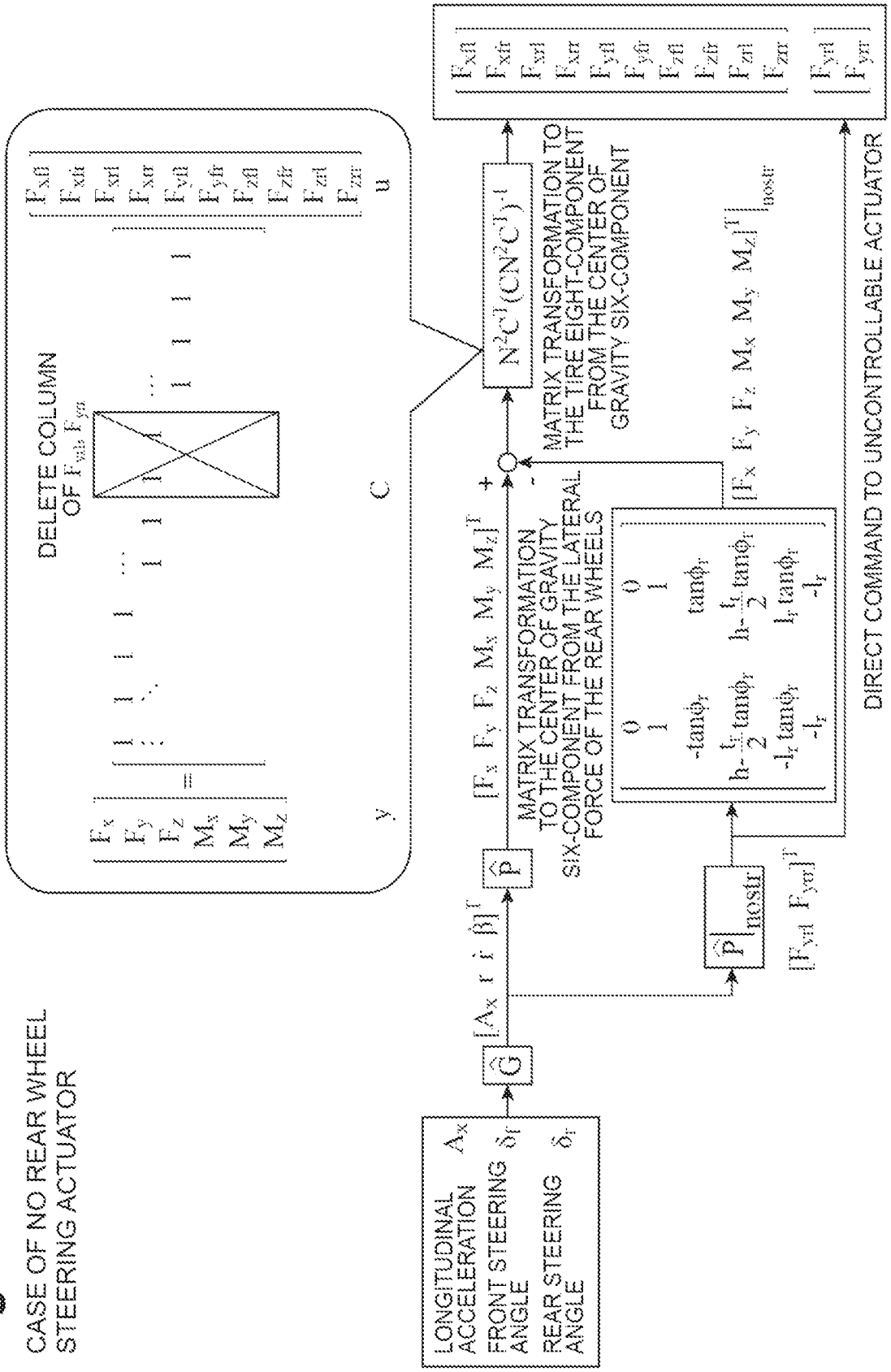
Fig.7 CASE OF NO REAR WHEEL STEERING ACTUATOR

VEHICLE CONTROL APPARATUS

CROSS-REFERENCE TO RELATED APPLICATION

This application claims the benefit of priority from Japanese Patent Application No. 2020-125484, filed Jul. 22, 2020, the entire contents of which are incorporated herein by reference.

TECHNICAL FIELD

The present disclosure relates to a vehicle control apparatus.

BACKGROUND

As a technical document related to vehicle control apparatus, Chinese Patent No. 103448716 is known. This document shows that the center of gravity six-component of the vehicle is obtained by giving the driver input as longitudinal acceleration and turning radius to the vehicle, and the driving force, steering, and vertical force of each wheel of the vehicle are obtained from the center of gravity six-component. It is also shown that the Lagrange multipliers method and constraint conditions are used to determine the driving force, steering, and vertical force of each wheel under specific conditions.

SUMMARY

In the above-described conventional method, for example, even when the pitch of the vehicle is controlled, the difference between the control target value of the pitch and the actual value occurs due to the influence of acceleration/deceleration, steering, and the like. That is, in actual vehicles, not only plane motion including forward after-movement and turning occurs due to acceleration/deceleration and steering, but also on-spring motion occurs due to inertia force acting on the center of gravity of the vehicles, and the suspension reaction force also acts, so it is necessary to consider the six degrees of freedom motion, which has not been considered in the conventional method. Further, when the Lagrange multipliers method and the constraint conditions are used to obtain the driving force of each wheel under specific conditions as in the above-described conventional method, there is a problem that a high calculation load is applied to the calculation device of the vehicle.

An aspect of the present disclosure is a vehicle control apparatus for performing vehicle control by a vehicle control actuator group based on a driver input, the apparatus comprising: a center of gravity six-component calculation unit for calculating a center of gravity six-component including a plane three-component and a three-component on spring as vehicle motion targets based on the driver input, a tire three-component calculation unit for calculating a tire three-component of four wheels of a vehicle based on the center of gravity six-component, a vehicle control unit for performing vehicle control by the vehicle control actuator group based on the tire three-component of the four wheels, and wherein the tire three-component calculation unit calculates the tire three-component of the four wheels from the center of gravity six-component by a coordinate transformation without repetition, which is normalization with the driving stiffness of each wheel and the cornering stiffness of each wheel, when the number of control requests in the vehicle control is less than degrees of freedom of the vehicle control actuator group.

According to the vehicle control apparatus according to an aspect of the present disclosure, when the number of control requests in the vehicle control is less than degrees of freedom in the vehicle control actuator group, the tire three-component of the four wheels is calculated from the center of gravity six-component by a coordinate transformation without a repetition normalization with the driving stiffness of each wheel and the cornering stiffness of each wheel. Thus, according to the vehicle control apparatus, it is possible to obtain a high degree of freedom control calculation result while reducing the calculation amount as compared with the calculation using the conventional Lagrange multipliers method and constraint conditions.

In the vehicle control apparatus according to one aspect of the present disclosure, the center of gravity six-component calculation unit calculates the plane three-component from the driver input by using a predetermined plane motion model, and calculates the center of gravity six-component by calculating the three-component on spring from the plane three-component by using a predetermined inertial motion model.

In the vehicle control apparatus according to an aspect of the present disclosure, the tire three-component calculation unit may calculate the tire three-component of each tire from the center of gravity six-component an inverse matrix of a coefficient matrix determined from specifications of the vehicle, when it is determined that the number of control requests in the vehicle control is the same as the degrees of freedom of the vehicle control actuator group and it is determined that the number of control requests in the vehicle control is the same as the degrees of freedom of the vehicle control actuator group.

In the vehicle control apparatus according to an aspect of the present disclosure, the tire three-component calculation unit may calculate tire three-component of each tire from the center of gravity six-component a coefficient matrix determined from the specifications of the vehicle and a least squares method when it is determined whether the number of control requests in the vehicle control exceeds the degrees of freedom of the vehicle control actuator group and it is determined that the number of control requests in the vehicle control exceeds the degrees of freedom of the vehicle control actuator group.

According to the vehicle control apparatus according to one aspect of the present disclosure, it is possible to obtain a high degree of freedom control calculation result while reducing the calculation amount based on the driver input.

BRIEF DESCRIPTION OF THE DRAWINGS

FIG. 5 is a flowchart showing an example of vehicle control calculation processing of the vehicle control apparatus.

FIG. 6 is a diagram for explaining an example of a calculation in the case where an active suspension is not provided.

FIG. 7 is a diagram for explaining an example of calculation in the case where the rear wheel steering actuator is not provided.

DETAILED DESCRIPTION

Embodiments of the present disclosure will be described below with reference to the drawings.

Figure 1:
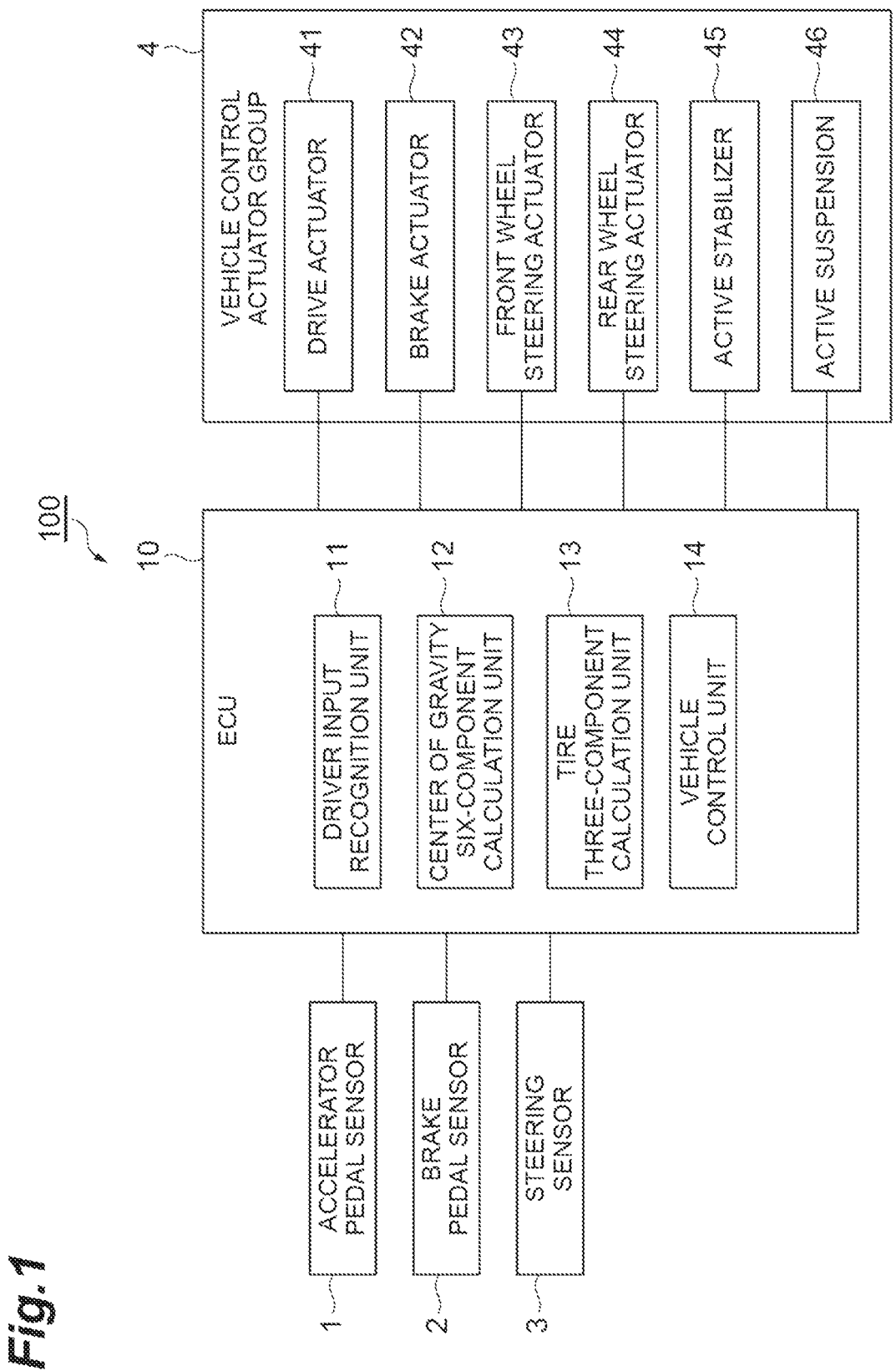
FIG. 1 is a block diagram showing a vehicle control apparatus according to an embodiment.

FIG. 1 is a block diagram showing a vehicle control apparatus according to an embodiment. The vehicle control apparatus 100 shown in FIG. 1 is mounted on a vehicle such as a four wheels passenger car or a freight car, and executes vehicle control based on a driver input. Driver input means accelerator operation, brake operation and steering by the driver. The vehicle control is the control of vehicle travel based on driver input. The vehicle control is the control of vehicle travel in response to driver input. The vehicle control may be a control emphasized a ride comfort or a control emphasized an operation response. The characteristics of the vehicle control are not particularly limited.

Configuration of Vehicle Control Apparatus

An example of the configuration of the vehicle control apparatus 100 will be described with reference to the drawings. As shown in FIG. 1, the vehicle control apparatus 100 includes an ECU [Electronic Control Unit] 10 for collectively managing the apparatus. The ECU 10 is an electronic control unit having a central processing unit [CPU], a read only memory [ROM], and a random-access memory [RAM]. For example, the ECU 10 loads a program stored in the ROM into the RAM, and executes the program loaded into the RAM by the CPU, thereby realizing various functions. The ECU 10 may comprise a plurality of electronic units. The ECU 10 is connected to an accelerator pedal sensor 1, a brake pedal sensor 2, a steering sensor 3, and a vehicle control actuator group 4.

The accelerator pedal sensor 1 is provided to the accelerator pedal of the vehicle and detects the amount of operation of the accelerator pedal by the driver. The operation amount of the accelerator pedal is, for example, a depression amount (pedal stroke amount) of the accelerator pedal by the driver.

The brake pedal sensor 2 is provided for the brake pedal of the vehicle, and is a sensor for detecting an operation amount of the brake pedal by the driver. The operation amount of the brake pedal is, for example, the depression amount (pedal stroke amount) of the brake pedal by the driver.

The steering sensor 3 detects an amount of operation of the steering portion of the vehicle by the driver. The steering portion includes, for example, a steering wheel and a steering shaft. The steering portion is not limited to a wheel-like configuration, and may be configured to function as a steering wheel. The operation amount of the steering portion is, for example, a steering angle and/or steering torque.

The vehicle control actuator group 4 is an actuator group for executing vehicle control. The vehicle control actuator group 4 in this embodiment includes a drive actuator 41, a brake actuator 42, a front wheel steering actuator 43, a rear wheel steering actuator 44, an active stabilizer 45, and an active suspension 46.

The drive actuator 41 controls the amount of air supplied to the engine (throttle opening) in accordance with a control command from the ECU 10 to control the driving force of the vehicle. When the vehicle is a hybrid vehicle, in addition to the amount of air supplied to the engine, a control command from the ECU 10 is input to a motor as a power source to control the driving force. When the vehicle is an electric vehicle, a control command from the ECU 10 is input to a motor as a power source to control the driving force. The motor as a power source in these cases corresponds to the drive actuator 41. The drive actuator 41 may be capable of changing the distribution of the driving force for each wheel of the vehicle. The drive actuator 41 may be capable of changing the distribution of the driving force for the front wheels and the driving force for the rear wheels, or may be capable of changing the distribution of the driving force for each of the four wheels.

The brake actuator 42 controls the braking system in accordance with a control command from the ECU 10, and controls the braking force applied to the wheels of the vehicle. As the brake system, for example, a hydraulic brake system can be used. The brake actuator 42 may be capable of altering the distribution of braking force to each wheel of the vehicle. The brake actuator 42 may be capable of changing the distribution of the braking forces to the front wheels and the braking forces to the rear wheels, or may be capable of changing the distribution of the braking forces to the four wheels.

The front wheel steering actuator 43 controls the steering angle of the front wheels of the vehicle in accordance with a control command from the ECU 10. The front wheel steering actuator 43 may be provided on the steering portion of the vehicle as an assist motor that is a part of the electric power steering system, or may be provided as a steer-by-wire that is mechanically independent of the steering portion of the vehicle.

The rear wheel steering actuator 44 controls the steering angle of the rear wheels of the vehicle in accordance with a control command from the ECU 10. The rear wheel steering actuator 44 is provided, for example, as a steer-by-wire, mechanically independent of the steering portion of the vehicle. The rear wheel steering actuator 44 may be an assist motor connected to the steering portion of the vehicle via a torque shaft.

The active stabilizer 45 controls the twist angle of the stabilizer bar in accordance with a control command from the ECU 10. The active stabilizer 45 is provided, for example, on the front and rear of the vehicle, and is controlled integrally.

The active suspension 46 controls suspension characteristics in accordance with a control command from the ECU 10. The active suspension 46 controls the suspension reaction force by adjusting the expansion and contraction by controlling the hydraulic pressure and the air pressure.

Next, a functional configuration of the ECU 10 will be described. The ECU 10 includes a driver input recognition unit 11, a center of gravity six-component calculation unit 12, a tire three-component calculation unit 13, and a vehicle control unit 14.

The driver input recognition unit 11 recognizes a driver input such as stepping on the accelerator pedal of the driver based on the detection results of the accelerator pedal sensor 1, the brake pedal sensor 2, and the steering sensor 3.

The driver input recognition unit 11 calculates a motion command (vehicle state quantity) corresponding to the driver input based on the recognized driver input. The driver input recognition unit 11 obtains, for example, a longitudinal acceleration $A_x$, a front steering angle $\delta_f$, and a rear steering angle $\delta_r$, as motion commands corresponding to the driver input. The method of known can be adopted for the calculation of the motion command from the driver input.

Figure 2B:
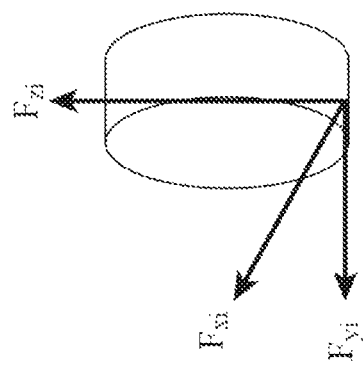
FIG. 2B shows a tire three-component.
Figure 2A:
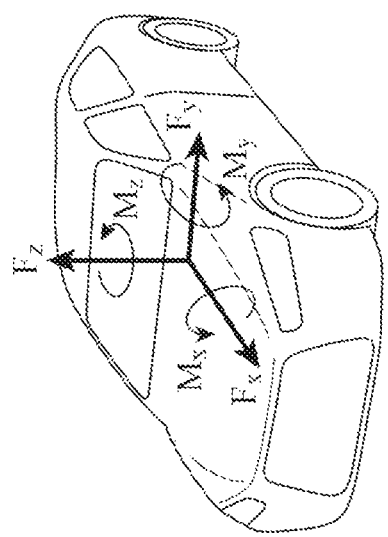
FIG. 2A shows the center of gravity six-component of the vehicle.

The center of gravity six-component calculation unit 12 calculates the center of gravity six-component as the vehicle motion target based on the motion command calculated from the driver input by the driver input recognition unit 11. FIG. 2A shows a center of gravity six-component of the vehicle. As shown in FIG. 2A, the center of gravity six-component of the vehicle is represented by the longitudinal forces $F_x$, the lateral forces $F_y$, the vertical forces $F_z$, the roll moment $M_x$, the pitch moment $M_y$, and the yaw moment $M_z$.

Figure 3:
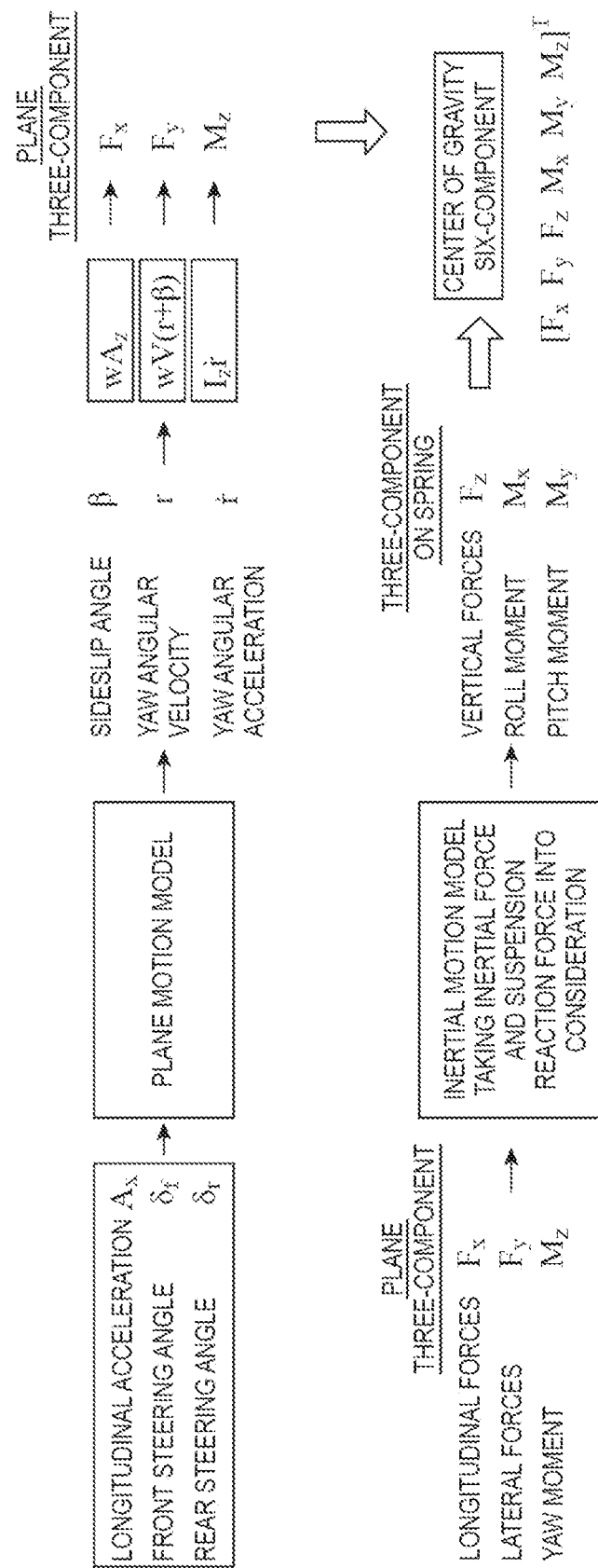
FIG. 3 is a diagram for explaining an example of a two steps calculation of the center of gravity six-component.

A center of gravity six-component calculation unit 12 calculates a plane three-component a plane motion model, and then calculates a center of gravity six-component by a two-step calculation of calculating a three-component on spring using an inertial motion model taking inertial force and suspension reaction force into consideration. The plane motion model and the inertial motion model are preset motion models. The plane motion model and the inertial motion model will be described in detail later. FIG. 3 is a diagram for explaining an example of a two-step calculation of the center of gravity six-component.

As shown in FIG. 3, the center of gravity six-component calculation unit 12 calculates the sideslip angle $\beta$, the yaw angular velocity "r", and the yaw angular acceleration "ṙ" by applying the longitudinal acceleration $A_x$, the front steering angle $\delta_f$, and the rear steering angle $\delta_r$, which are motion commands corresponding to the driver input, to the plane motion model. The plane motion model is reflected, for example, the dynamic characteristics of the vehicle.

As an example of the plane motion model, a two-wheel model can be adopted. In this case, the center of gravity six-component calculation unit 12 can obtain the yaw angular velocity "r" from the front steering angle $\delta_f$ using the following equation (1). $G_r$ is the steady yaw rate gain, $T_r$ is the molecular first order coefficient of the yaw rate transfer function with respect to the steering angle, $\omega_n$ is the natural frequency, $\xi$ is the steering response damping ratio, and "s" is the Laplace operator. The yaw angular acceleration is obtained as the time derivative of the yaw angular velocity "r".

Formula 1

$$r = G_r \frac{T_r s + 1}{\frac{1}{\omega_n^2}s^2 + \frac{2\xi}{\omega_n}s + 1} \delta_f \qquad (1)$$

The center of gravity six-component calculation unit 12 can obtain the sideslip angle $\beta$ from the front steering angle $\delta_f$ using the following equation (2). $G_b$ is the steady sideslip angle gain, and $T_b$ is the molecular first order coefficient of the sideslip angle transfer function for steering angle.

Formula 2

$$\beta = G_b \frac{T_b s + 1}{\frac{1}{\omega_n^2}s^2 + \frac{2\xi}{\omega_n}s + 1} \delta_f \qquad (2)$$

The plane motion model is not limited to the two-wheel model. Other models equivalent to the two-wheel model may be used.

A center of gravity six-component calculation unit 12 calculates a plane three-component from sideslip angle $\beta$, yaw angular velocity r, and yaw angular acceleration "ṙ" using a plane motion model. The center of gravity six-component calculation unit 12 calculates the longitudinal forces $F_x$, lateral forces $F_y$, and yaw moment $M_z$ of the center of gravity six-component as a plane three-component. The method of known can be adopted for the determination of the plane three-component based on the sideslip angle $\beta$, yaw angular velocity r, and yaw angular acceleration "ṙ".

A center of gravity six-component calculation unit 12 calculates a three-component on spring from a plane three-component ($F_x$, $F_y$, $M_z$) using an inertial motion model taking inertial force and suspension reaction force into consideration. The inertial motion model is a coupled model (relative motion model between the upper spring and the lower spring) considering inertial force and suspension reaction force. The center of gravity six-component calculation unit 12 calculates vertical forces $F_z$, roll moment $M_x$, and pitch moment $M_y$ as three-components on spring. If necessary, warp moment $M_w$ is also added as a motion control command value.

The inertial motion model can be represented by the following equations (3) to (9) as an example. $\theta_f$ is the anti-dive angle or anti-lift angle of the front wheel, $\theta_r$ is the anti-lift angle or anti-squat angle of the rear wheel, h is the height of the center of gravity, $l_f$ is the distance from the center of gravity to the front wheel axles, $l_r$ is the distance from the center of gravity to the rear wheel axles, $t_f$ is the front wheel tread width, $t_r$ is the rear wheel tread width, $\varphi_f$ is the angle formed by a straight line connecting the center of the front wheel and the front wheel contact point to the ground, and $\varphi_r$ is the angle formed by a straight line connecting the center of the rear wheel and the rear wheel contact point to the ground.

Formula 3

$$y_z = C_{zx} u_x \qquad (3)$$

$$y_z = [\, F_z \quad M_x \quad M_y \quad M_w \,]^T \qquad (4)$$

$$u_x = [\, F_{x1} \quad F_{x2} \quad F_{x3} \quad F_{x4} \,]^T \qquad (5)$$

$$C_{zx} = \begin{bmatrix} -\tan\theta_f & -\tan\theta_f & \tan\theta_r & \tan\theta_r \\ -\frac{t_f}{2}\tan\theta_f & \frac{t_f}{2}\tan\theta_f & \frac{t_r}{2}\tan\theta_r & -\frac{t_r}{2}\tan\theta_r \\ l_f\tan\theta_f - h & l_f\tan\theta_f - h & l_r\tan\theta_r - h & l_r\tan\theta_r - h \\ -\frac{t_f}{2}\tan\theta_f & \frac{t_f}{2}\tan\theta_f & -\frac{t_r}{2}\tan\theta_r & \frac{t_r}{2}\tan\theta_r \end{bmatrix} \qquad (6)$$

$$y_z = C_{zy} u_y \qquad (7)$$

$$u_y = [\, F_{y1} \quad F_{y2} \quad F_{y3} \quad F_{y4} \,]^T \qquad (8)$$

$$C_{zy} = \begin{bmatrix} -\tan\phi_f & \tan\phi_f & -\tan\phi_r & \tan\phi_r \\ h - \frac{t_f}{2}\tan\phi_f & h - \frac{t_f}{2}\tan\phi_f & h - \frac{t_r}{2}\tan\phi_r & h - \frac{t_r}{2}\tan\phi_r \\ l_f\tan\phi_f & -l_f\tan\phi_f & -l_r\tan\phi_r & l_r\tan\phi_r \\ -\frac{t_f}{2}\tan\phi_f & -\frac{t_f}{2}\tan\phi_f & \frac{t_r}{2}\tan\phi_r & \frac{t_r}{2}\tan\phi_r \end{bmatrix} \qquad (9)$$

The inertial motion model is not limited to the models shown in Equations (3) to (9). The inertial motion model may be a coupled model in which inertial force and suspension reaction force are considered.

The center of gravity six-component calculation unit 12 calculates a center of gravity six-component ($F_x$, $F_y$, $F_z$, $M_x$, $M_y$, $M_z$) by calculating a three-component on spring ($F_z$, $M_x$, $M_y$) from a plane three-component ($F_x$, $F_y$, $M_z$) using an inertial motion model.

The tire three-component calculation unit 13 calculates the tire three-component of the four wheels based on the center of gravity six-component calculation unit 12. FIG. 2B shows a tire three-component. As shown in FIG. 2B, the tire three-component is expressed as the tire longitudinal force Fxi, lateral force Fyi, and vertical force Fzi. Where "i" is a symbol that varies depending on the position of the tire.

Specifically, the tire three-component of the right front wheel is expressed as a longitudinal force $F_{xfr}$, a lateral force $F_{yfr}$, and a vertical force $F_{zfr}$. The tire three-component of the left front wheel is expressed as a longitudinal force $F_{xfl}$, a lateral force $F_{yfl}$, and a vertical force $F_{zfl}$. Similarly, the tire three-component of the right rear wheel is represented as a longitudinal force $F_{xrr}$, a lateral force $F_{yrr}$, and a vertical force $F_{zrr}$. The tire three-component of the left rear wheel is expressed as a longitudinal force $F_{xrl}$, a lateral force $F_{yrl}$, and a vertical force $F_{zrl}$. The tire three-component of all wheels together are caller a twelve-component.

The tire three-component calculation unit 13 calculates a tire three-component of the four wheels from the center of gravity six-component by a balance relationship between the center of gravity six-component and the tire three-component of the four wheels. The balance relationship can be represented by the following equation (10) to (14). "y" is a vector representing the center of gravity six-component, C is a coefficient matrix, and "u" is a vector representing the tire twelve-component of four wheels. The coefficient matrix C will be described in detail later.

Formula 4

$$y = Cu \quad (11)$$

$$y = \begin{bmatrix} Fx \\ Fy \\ Fz \\ Mx \\ My \\ Mz \end{bmatrix} \quad (11)$$

$$C = \begin{bmatrix} C_{11} & C_{12} & \cdots & C_{1n} \\ C_{21} & \ddots & & C_{2n} \\ \vdots & & & \vdots \\ C_{m1} & \cdots & C_{m-1n} & C_{mn} \end{bmatrix} \quad (12)$$

-continued $$u = \begin{bmatrix} F_{xfl} \\ F_{xfr} \\ F_{xrl} \\ F_{xrr} \\ F_{yfl} \\ F_{yfr} \\ F_{yrl} \\ F_{yrr} \\ F_{zfl} \\ F_{zfr} \\ F_{zrl} \\ F_{zrr} \end{bmatrix} \quad (13)$$

$$\begin{bmatrix} Fx \\ Fy \\ Fz \\ Mx \\ My \\ Mz \end{bmatrix} = \begin{bmatrix} C_{11} & C_{12} & \cdots & C_{1n} \\ C_{21} & \ddots & & C_{2n} \\ \vdots & & & \vdots \\ C_{m1} & \cdots & C_{m-1n} & C_{mn} \end{bmatrix} \begin{bmatrix} F_{xfl} \\ F_{xfr} \\ F_{xrl} \\ F_{xrr} \\ F_{yfl} \\ F_{yfr} \\ F_{yrl} \\ F_{yrr} \\ F_{zfl} \\ F_{zfr} \\ F_{zrl} \\ F_{zrr} \end{bmatrix} \quad (14)$$

The parameter $C_{11}$ to $C_{mn}$ which constitutes the coefficient matrix C is determined from the specifications of the vehicle. The number of rows of the coefficient matrix C corresponds to the number of control request "m" in vehicle control. The number of control request "m" is the number of motions to be controlled in vehicular control. For example, when it is sufficient to control only longitudinal motion, lateral motion, and yaw motion, the number of control request "m" is three. In this case, motions other than those in the front-rear direction, the lateral direction, and the yaw direction allow natural events to follow their course.

The number of columns of coefficient matrix C corresponds to degrees of freedom "n" in vehicle control actuator group 4. The degrees of freedom "n" of the vehicle control actuator group 4 is the sum of the degrees of freedom of the actuators constituting the vehicle control actuator group 4.

The drive actuator 41 is one degree of freedom when the front wheel drive force and the rear wheel drive force are fixedly distributed (for example, when they are distributed at 50:50). The drive actuator 41 is two degrees of freedom when only the distribution of the front wheel driving force and the rear wheel driving force can be changed. When the front wheel driving force and the rear wheel driving force are fixed but the distribution of the right front wheel driving force and the left front wheel driving force can be changed, the drive actuator 41 becomes two degrees of freedom. Similarly, the drive actuator 41 becomes two degrees of freedom when the distribution of the drive force of the right rear wheel and the drive force of the left rear wheel can be changed while the front wheel drive force and the rear wheel drive force are fixed.

The drive actuator 41 is three degrees of freedom, when the distribution of the drive force of the right front wheel and the drive force of the left front wheel can be changed while the front wheel drive force and the rear wheel drive force are fixedly distributed, and the distribution of the drive force of the right rear wheel and the drive force of the left rear wheel can be changed. The drive actuator 41 is three degrees of freedom when the distribution of the front wheel driving force and the rear wheel driving force can be changed, and the distribution of the right front wheel driving force and the left front wheel driving force can be changed. Similarly, the drive actuator 41 is three degrees of freedom when the distribution of the front wheel drive force and the rear wheel drive force can be changed and the distribution of the right rear wheel drive force and the left rear wheel drive force can be changed.

The drive actuator 41 is four degrees of freedom when the distribution of the driving force of each four wheel can be changed individually. An example of degrees of freedom of the brake actuator 42 is the same as that of the drive actuator 41, and therefore the description thereof is omitted. The degrees of freedom of the brake actuator 42 and the degrees of freedom of the drive actuator 41 need not be the same.

Since the front wheel steering actuator 43 controls only the front wheel steering force, it is 1 degrees of freedom, and since the rear wheel steering actuator 44 also controls only the rear wheel steering force, it is one degrees of freedom. The vehicle control actuator group 4 is two degrees of freedom when the vehicle control actuator group 4 has the front wheel steering actuator and the rear wheel steering actuator, and the front wheel steering actuator and the rear wheel steering actuator are controlled respectively.

The active stabilizer 45 is one degree of freedom for controlling roll rigidity only, and the active suspension 46 is three degrees of freedom. The active suspension 46 is provided to each of the four wheels. The body of the vehicle is three degrees of freedom (roll, pitch, and yaw).

The degrees of freedom in the vehicle control actuator group 4 may be fixed values according to the specifications of the vehicle or may be values varying according to the state of each actuator. For example, if an abnormality is detected in each actuator, the degrees of freedom of the vehicle control actuator group 4 may be reduced by assuming that the actuator becomes unusable. If it is determined that thermal protection is necessary for each actuator, the degrees of freedom in the vehicle control actuator group 4 may be reduced as not using the actuator. The method of known can be adopted for the abnormality detection of the actuator and the determination of the thermal protection.

The tire three-component calculation unit 13 calculates a four wheels tire three-component from a center of gravity six-component by a different method according to the magnitude relationship (the magnitude relationship between the number of rows and the number of columns of the coefficient matrix C) between the number of control request "m" and the degrees of freedom "n" of the vehicle control actuator group 4. For example, the tire three-component calculation unit 13 determines the magnitude relationship between the number of control request "m" and the degrees of freedom "n" in the vehicle control actuator group 4.

("m"="n")

When the coefficient matrix C is a regular matrix, the tire three-component calculation unit 13 can calculate the four wheels tire three-component "u" (tire twelve-component) from the center of gravity six-component "y" using the inverse matrix of the coefficient matrix C as shown in the following equation (16).

Formula 5

$$u = C^{-1}y \quad (15)$$

("m">"n")

Since a solution satisfying all of the four wheels tire three-component "u" is not obtained, the tire three-component calculation unit 13 obtains a solution by the least square method by weighting each of the control requests in the vehicular control. The objective function f(u) is defined as equation (16) below. Here, $W_c$ is a weight matrix for each of the control requests, and is expressed by the following equation (17) as an example.

Formula 6

$$f(u) = \frac{1}{2} W_e \|(Cu - y)\|_2^2 \quad (16)$$

$$W_e = \text{diag}([\ w_{fx}\ \ w_{fy}\ \ w_{fz}\ \ w_{mx}\ \ w_{my}\ \ w_{mz}\ ]) \quad (17)$$

$$\frac{\partial f(u)}{\partial u} = C^T W_e (Cu - y) = 0 \quad (18)$$

$$u = (C^T W_e C)^{-1} C^T W_e y \quad (19)$$

The tire three-component calculation unit 13 calculates the extreme value using the above-mentioned equations (18) and (19), thereby calculating the tire three-component "u" of the four wheels.

("m"<"n")

In this case, it is generally considered to obtain a solution by the Lagrange multiplier method. The Lagrangian function L is defined as the following equation (20). The solution of the least square method is obtained with the constraint condition by partially differentiated the equation (20) with the tire three-component "u" and the Lagrange multiplier λ. for example, the constraint condition can be "$F_{yfl}/F_{yfr}=F_{zfl}/F_{zfr}$".

Formula 7

$$L(u, \lambda) = \frac{1}{2} u^T u - \lambda^T (Cu - y) \quad (20)$$

$$\frac{\partial L(u, \lambda)}{\partial u} = u - C^T \lambda = 0 \quad (21)$$

$$\frac{\partial L(u, \lambda)}{\partial \lambda} = -Cu + y = 0 \quad (22)$$

$$u = C^T (CC^T)^{-1} y \quad (23)$$

Figure 4B:
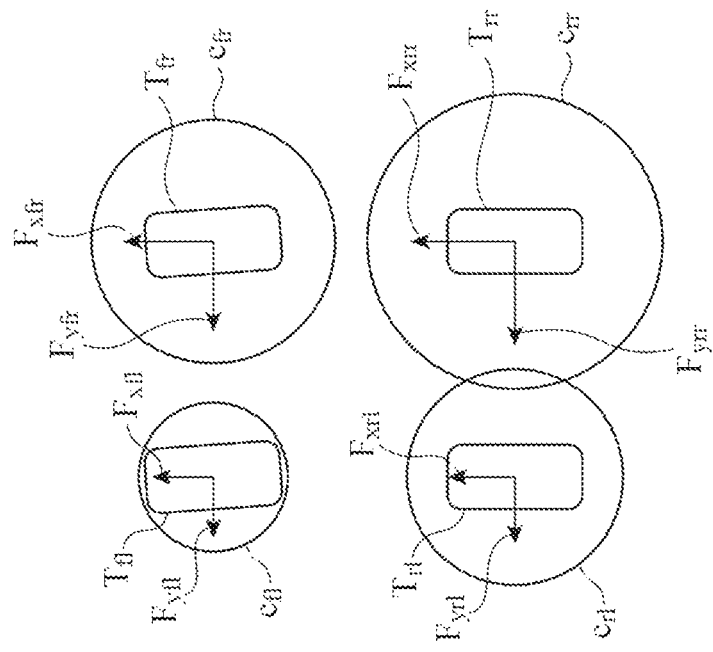
FIG. 4B is a diagram showing an example of the longitudinal force and the lateral force of each wheel obtained by the coordinate transformation of this embodiment.
Figure 4A:
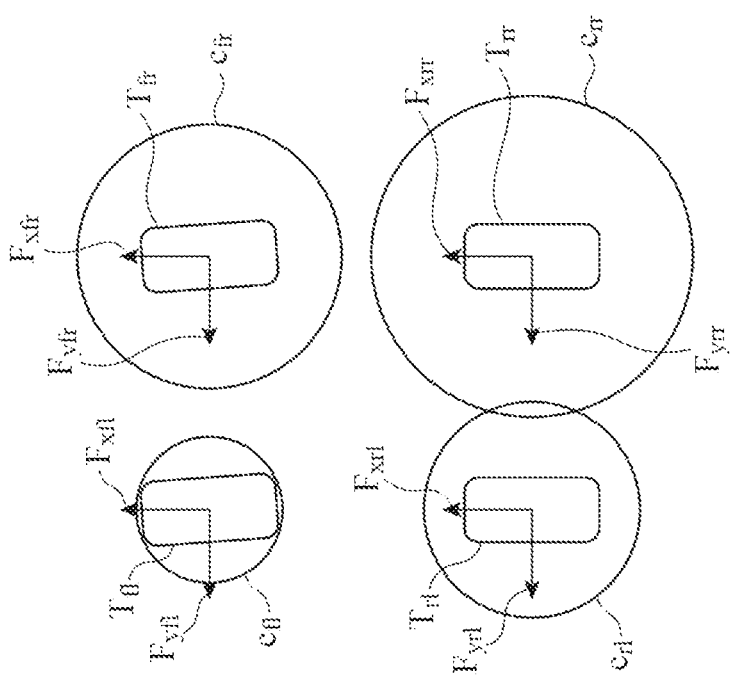
FIG. 4A is a diagram showing an example of the longitudinal force and lateral force of each wheel obtained by calculation using the Lagrange multiplier method and constraint conditions.

Here, FIG. 4A is a diagram showing an example of the longitudinal force and the lateral force of each wheel obtained by the calculation using the Lagrange multiplier method and the constraint conditions. In FIG. 4A, it is assumed that the vehicle is running on a curve. FIG. 4A shows a left front wheel $T_{fl}$, a right front wheel $T_{fr}$, a left rear wheel $T_{rl}$, and a right rear wheel $T_{rr}$. FIG. 4A shows the friction circle $C_{fl}$ of the left front wheel $T_{fl}$, the longitudinal $F_{xfl}$ of the left front wheel $T_{fl}$, and the lateral force $F_{yfl}$ of the left front wheel $T_{fl}$. Similarly, the friction circle $C_{fr}$ of the right front wheel $T_{fr}$, the longitudinal force $F_{xfr}$ of the right front wheel $T_{fr}$, the lateral force $F_{yfr}$ of the right front wheel $T_{fr}$, the friction circle $C_{rl}$ of the left rear wheel $T_{rl}$, the longitudinal force $F_{xrl}$ of the left rear wheel $T_{rl}$, the lateral force $F_{yrl}$ of the left rear wheel $T_{rl}$, and the friction circle $C_{rr}$ of the right rear wheel $T_{rr}$, the longitudinal force $F_{xrr}$ of the right rear wheel $T_{rr}$, and the lateral force $F_{yrr}$ of the right rear wheel $T_{rr}$ are shown.

As shown in FIG. 4A, in the case of the calculation using the Lagrange multiplier method and the constraint conditions, a solution for generating an equal force to each wheel is obtained so as to satisfy the center of gravity six-component "y". In the calculation by the undetermined multiplier method of the Lagrangian using the constraint condition, it is necessary to increase the number of rows of the coefficient matrix C and the center of gravity six-component "y"(vector of the control request), which increases the calculation load of the ECU 10. Further, as shown in FIG. 4A, the solution for generating an equal force in each wheel is a distribution that neglects the friction circle, and there are problems in the utilization rate of the tire friction circle, the limit performance, and the disturbance stability.

On the other hand, in the tire three-component calculation unit 13 of the vehicle control apparatus 100 according to the present embodiment, when the number of control request "m" in the vehicle control is less than degrees of freedom "n" in the vehicle control actuator group, the four wheel tire three-component "u" is calculated from the center of gravity six-component "y" by a coordinate transformation without repetition which is normalization with the driving stiffness of each wheel and the cornering stiffness of each wheel.

Here, when the Lagrangian undetermined multiplier method was used, it was equivalent to minimizing the evaluation function J shown in the following equation (24), if only the longitudinal and lateral forces at each wheel were used.

Formula 8

$$J = \sum_{i=1}^{4} (F_{xi}^2 + F_{yi}^2) \quad (24)$$

In this embodiment, minimization of the evaluation function J of the following equation (25) is considered in consideration of minimization of the tire friction circle utilization factor. $C_x w_i$ is the driving stiffness of each wheel, and $C_y w_i$ is the cornering stiffness of each wheel. "i" is an optional symbol corresponding to the position of the tire. Based on this, coordinate transformation is performed so as to become an axis normalized by the load.

Formula 9

$$J = \sum_{j=1}^{4} \left( \frac{F_{xi}^2}{C_x w_i} + \frac{F_{yi}^2}{C_y w_i} \right) \quad (25)$$

Here, the driving stiffness $C_x w_i$ of each wheel and the cornering stiffness $C_y w_i$ of each wheel on the diagonal components define matrix N having an arbitrary weight $w_z$ as expressed by the following equation (26). Using this matrix N, the above-mentioned equation (14) is transformed into the following equation (27).

Formula 10

$$N = \text{diag}([C_x w_{ff} C_x w_{fr} C_x w_{rl} C_x w_{rr} C_y w_{fl} C_y w_{fr} W_y w_{rl} C_y w_{rr}, w_z, w_z, w_z, w_z])^{1/2} \quad (26)$$

$$y = CNN^{-1}u \quad (27)$$

In the above equation (27), the following equation (28) is obtained by assuming that the coefficient matrix C is transformed with matrix N and that tire three-component "u" is transformed by $N^{-1}$ (CN=C', $N^{-1}u=u'$). From this, the tire three-component "u" of the four wheels is obtained through the process of obtaining the above equation (23), and the following equation (29) is obtained.

Formula 11

$$y = CNN^{-1}u \triangleq C'u' \quad (28)$$

$$u = N^2 C^T (CN^2 C^T)^{-1} y \quad (29)$$

The tire three-component calculation unit 13 calculates the tire three-component "u" from the center of gravity six-component "y" by using the above equation (29), and by coordinate transformation without repetition, which is normalized by the driving stiffness $C_x w_i$ of each wheel, the cornering stiffness $C_y w_i$ of each wheel, and an arbitrary weight $w_z$. Equation (29) is only an example, and the coordinate transformation according to the present embodiment is not limited to the case where equation (29) is used. The tire three-component calculation unit 13 may calculate the tire three-component "u" without repetition by using an calculation equation corresponding to the above equation (29). Without repetition means no iteration.

FIG. 4B is a diagram showing an example of the longitudinal force and the lateral force of each wheel obtained by the coordinate transformation of this embodiment. As shown in FIG. 4B, the tire three-component calculation unit 13 performs the above-described calculation in consideration of the minimization of the tire friction circle utilization factor, so that it is possible to obtain a solution in which disturbance stability and limit performance are improved as compared with the conventional one. In addition, energy consumption and tire wear can be reduced as compared with the prior art.

Further, according to the above method, the tire three-component "u" of the four wheels can be calculated by the coordinate transformation without iterative calculation, compared with the conventional method using the undetermined Lagrangian multiplier method with a constraint condition and the method in which the constraint condition and the evaluation function are approximated to obtain the approximate solution of the optimum solution by iterative calculation. Thus, the calculation load can be greatly reduced.

The vehicle control unit 14 transmits a control command to the vehicle control actuator group 4 based on the tire three-component "u" of the four wheels calculated by the tire three-component calculation unit 13, thereby realizing vehicle control according to the driver input.

The vehicle control unit 14 may have a function of a device-driver for converting the tire three-component "u" of the four wheels into a control command adapted to an interface of each actuator. The vehicle control unit 14 may convert the longitudinal force $F_{xi}$ of each wheel into a control command $F_{xci}$ for the drive actuator 41 by, for example, driving force waveform shaping (driving system damping control). For the driving force waveform shaping, for example, an inverse driving system model of known can be used. The vehicle control unit 14 may output the control command of the longitudinal force as it is. The control command for the brake actuator 42 may be the same.

The vehicle control unit 14 may convert the lateral forces $F_{yi}$, the sideslip angle β, the yaw velocity "r", and the vehicle speed $V_x$ in the front-rear direction of each wheel into the control command $δ_f$ for the front wheel steering actuator 43 and the control command $δ_r$ for the rear wheel steering actuator 44, for example, by the steering calculations of known. The vehicle control unit 14 may convert the vertical force $F_{zi}$ of each wheel into a control command for the active stabilizer 45 by using, for example, the inverse active stabilizer model of known. When the active stabilizer 45 uses the roll moment as an interface, it converts the roll moment by coordinate transformation. The vehicle control unit 14 may convert the vertical force $F_{zi}$ of each wheel into a control command for the active suspension 46 by using, for example, an inverse active suspension model of known.

Processing of Vehicle Control Apparatus

Next, an example of the processing of the vehicle control apparatus 100 according to this embodiment will be described with reference to FIG. 5. FIG. 5 is a flowchart showing an example of vehicle control calculation processing of the vehicle control apparatus 100.

As shown in FIG. 5, the ECU 10 of the vehicle control apparatus 100 recognizes the driver input by the driver input recognition unit 11 in S10. The driver input recognition unit 11 recognizes a driver input such as stepping on the accelerator pedal of the driver based on the detection results of the accelerator pedal sensor 1, the brake pedal sensor 2, and the steering sensor 3. The driver input recognition unit 11 calculates a motion command corresponding to the driver input based on the recognized driver input. The driver input recognition unit 11 obtains, for example, a longitudinal acceleration $A_x$, a front steering angle $\delta_f$, and a rear steering angle $\delta_r$, as motion commands corresponding to the driver input. Thereafter, the ECU 10 proceeds to S12.

In S12, the ECU 10 calculates the plane three-component by the center of gravity six-component calculation unit 12. A center of gravity six-component calculation unit 12 calculates the plane three-component (longitudinal forces $F_x$, lateral forces $F_y$, and yaw moment $M_z$) by using a plane motion model with longitudinal accelerations $A_x$, front steering angle $\delta_f$, and rear steering angle $\delta_r$, which are motion commands corresponding to driver input. Thereafter, the ECU 10 proceeds to S14.

In S14, the ECU 10 calculates the three-component on spring by the center of gravity six-component calculation unit 12. A center of gravity six-component calculation unit 12 calculates a three-component on moment $M_x$ (vertical forces $F_z$, roll moment $M_x$, and pitch moment $M_y$) from a plane three-component an inertial motion model taking inertial forces and suspension reaction forces into consideration. Thereafter, the ECU 10 proceeds to S16.

In S16, the ECU 10 calculates the center of gravity six-component "y" by the center of gravity six-component calculation unit 12. The center of gravity six-component calculation unit 12 calculates the center of gravity six-component "y" (longitudinal force $F_x$, lateral force $F_y$, vertical force $F_z$, roll moment $M_x$, pitch moment $M_y$, and yaw moment $M_z$) by combining the plane three-component and the three-component on spring. Thereafter, the ECU 10 proceeds to S18.

In step S18, the ECU 10 determines by the tire three-component calculation unit 13 whether the number of control request "m" in the vehicular control is less than the degrees of freedom "n" of the vehicle control actuator group 4 (m<n). When the number of control request "m" is less than the degrees of freedom "n" of the vehicle control actuator group 4 (S18: YES), the ECU 10 proceeds to S20. When the number of control request "m" is not less than the degrees of freedom "n" of the vehicle control actuator group 4 (S18: NO), the ECU 10 proceeds to S22.

In step S20, the ECU 10 calculates the tire three-component "u" of the four wheels using coordinate transformation by the tire three-component calculation unit 13. The tire three-component calculation unit 13 calculates the tire three-component "u" of four wheels from the center of gravity six-component "y" by coordinate transformation without repetition, which is normalized by the driving stiffness $C_x w_i$ of each wheel and the cornering stiffness $C_y w_i$ of each wheel. The tire three-component calculation unit 13 obtains the tire three-component "u" of the four wheels, for example, by using the above-mentioned equation (29). Thereafter, the ECU 10 proceeds to S30.

In step S22, the ECU 10 determines whether or not the number of control request "m" and the degrees of freedom "n" of the vehicle control actuator group 4 are the same (m=n) by the tire three-component calculation unit 13. When the number of control require "m" and the degrees of freedom "n" of the vehicle control actuator group 4 are the same (S22: YES), the ECU 10 proceeds to S24. When the number of control request "m" and the degrees of freedom "n" in the vehicle control actuator group 4 are not the same (S22: NO), the ECU 10 proceeds to S26. When the determination in step S18 is NO and the determination in step S22 is NO, the number of control request "m" exceeds the degrees of freedom "n" of the vehicle control actuator group 4 (m>n).

In step S24, the ECU 10 calculates the tire three-component "u" of the four wheels using the inverse matrix of the coefficient matrix C by the tire three-component calculation unit 13. The tire three-component calculation unit 13 calculates the tire three-component "u" of the four wheels, for example, using the above-mentioned equation (15). Thereafter, the ECU 10 proceeds to S30.

In step S26, the ECU 10 calculates the tire three-component "u" using the least squares method by the tire three-component calculation unit 13. The tire three-component calculation unit 13 calculates the extreme value using the above-mentioned equations (18) and (19), for example, to thereby calculate the tire three-component "u" of the four wheels. Thereafter, the ECU 10 proceeds to S30.

In S30, the ECU 10 transmits a control command to the vehicle control actuator group 4 by the vehicle control unit 14, thereby realizing vehicle control according to the driver input. The vehicle control unit 14 may convert the tire three-component "u" into a control command suitable for the interface of each actuator and transmit the control command.

According to the vehicle control apparatus 100 according to the present embodiment described above, when the number of control requests in the vehicle control is less than degrees of freedom in the vehicle control actuator group, the tire three-component of the four wheels is calculated from the center of gravity six-component "y" by a coordinate transformation without a repetition normalization with the driving stiffness of each wheel and the cornering stiffness of each wheel. Thus, according to the vehicle control apparatus 100, it is possible to obtain a high degree of freedom control calculation result while reducing the calculation amount as compared with the calculation using the conventional Lagrange multipliers method and constraint conditions.

Further, according to the vehicle control apparatus 100, since a two-step calculation is performed by calculating a plane three-component from the driver input by using a plane motion model and calculating a three-component on spring from the plane three-component by using an inertial motion model, the accuracy of the center of gravity six-component "y" can be improved as compared with the conventional case in which the center of gravity six-component "y" is calculated by a one-step calculation from the driver input.

Further, according to the vehicle control apparatus 100, it is determined whether the number of control request "m" in the vehicle control is the same as the degrees of freedom "n"

in the vehicle control actuator group 4, and when it is determined that the number of control request "m" in the vehicle control is the same as the degrees of freedom "n" in the vehicle control actuator group 4, the tire three-component "u" of the four wheels can be calculated from the center of gravity six-component "y" using the inverse matrix C of the coefficient degrees determined from the specifications of the vehicle, so that an appropriate calculation method according to the condition of the vehicle can be selected to calculate the tire three-component "u" of the four wheels.

Further, according to the vehicle control apparatus 100, when it is determined whether or not the number of control request "m" in the vehicle control exceeds the degrees of freedom "n" of the vehicle control actuator group 4 and it is determined that the number of control request "m" in the vehicle control exceeds the degrees of freedom "n" of the vehicle control actuator group 4, tire three-component "u" is calculated from the center of gravity six-component "y" using the coefficient matrix C determined from the specifications of the vehicle and the least square method, so that an appropriate calculation method according to the situation of the vehicle can be selected to calculate the three-component "u" of the four wheels.

The embodiment of the present disclosure is described above, but the present disclosure is not limited to the above-described embodiment. The present disclosure can be implemented in various forms including various modifications and improvements based on the knowledge of those skilled in the art including the above-described embodiment.

First Modification

As a first modification, a case where an actuator for controlling the vertical force of the active suspension 46 or the like is not provided will be described. When the active suspension 46 is not provided, the vertical force of each wheel becomes uncontrollable. Therefore, the calculation of the tire three-component "u" of the four wheels by the tire three-component calculation unit 13 is substantially a calculation of the tire two-component (longitudinal force and lateral force) of the four wheels.

FIG. 6 is a diagram for explaining an example of calculation in the case where the active suspension 46 is not provided. In FIG. 6, the calculation of the center of gravity six-component "y" described in the above embodiment is shown as P (hat on P). In addition, the total of the two-component forces of the four wheels tires is expressed as tire eight-component forces.

As shown in FIG. 6, in the modified example of first, the tire three-component calculation unit 13 performs an calculation using a coefficient matrix C excluding the vertical forces $F_{zi}$ of each wheel. The tire three-component calculation unit 13 obtains an appropriate longitudinal force $F_{xi}$ and lateral force $F_{yi}$ for each wheel by using a coefficient matrix C excluding the vertical force $F_{zi}$ of each wheel. The vertical force $F_{zi}$ of the tire three-component "u" may be output as 0.

As described above, according to the modified example of first, even in the case where the active suspension 46 is not provided, it is possible to calculate the four wheels tire three-component "u" from the center of gravity six-component "y" by the coordinate transformation without repetition, which is normalized by the driving stiffness $C_x w_i$ of each wheel and the cornering stiffness $C_y w_i$ of each wheel, and it is possible to obtain the control calculation result of high degrees of freedom while reducing the calculation amount. The modification of the first is not limited to the case where the vehicle does not have the active suspension 46, and can be applied to the case where it is determined that the active suspension 46 cannot be used due to the necessity of abnormality detection or thermal protection.

Second Modification

As a second modification, a case where the rear wheel steering actuator 44 is not provided will be described. Without the rear wheel steering actuator 44, the lateral force of the rear wheels is uncontrollable. Therefore, the tire three-component calculation unit 13 performs the calculation of the tire three-component substantially for the rear wheels as the calculation of the tire two-component forces (longitudinal forces, vertical forces).

FIG. 7 is a diagram for explaining an example in which the rear wheel steering actuator 44 is not provided. In FIG. 7, the calculation for obtaining the longitudinal accelerations $A_x$, sideslip angle β, yaw angular velocity "r", and yaw angular acceleration "r" described in the above embodiment is shown as Ĝ (hat on G), and the calculation for the center of gravity six-component "y" described in the above embodiment is shown as P̂. Also, the calculation of the center of gravity six-component without rear wheel steering is shown as $\hat{P}|_{nostr}$. In FIG. 6, Ĝ is omitted.

As shown in FIG. 7, in the modified example of second, the tire three-component calculation unit 13 calculates the lateral forces of the respective wheels in the case where there is no rear wheel steering in parallel to obtain the center of gravity six-component in the case where there is no rear wheel steering. The tire three-component calculation unit 13 subtracts the center of gravity six-component in the case where there is no rear wheel steering from the original center of gravity six-component (the center of gravity six-component "y" in the case where there is rear wheel steering), and obtains a solution by using a coefficient matrix C obtained by removing the lateral forces $F_{yrl}$ and $F_{yrr}$ of the rear wheels.

The tire three-component calculation unit 13 calculates a tire three-component excluding the lateral forces $F_{yrl}$ and $F_{yrr}$ of the rear wheels. Here, even when the lateral force of the rear wheels cannot be controlled, since the rear wheels generate lateral force by turning or the like, the force exerted by the lateral force on the center of gravity of the vehicle is calculated and subtracted in advance. For example, the subtracted lateral forces $F_{yrl}$ and $F_{yrr}$ of the rear wheels are directly output to an actuator that cannot be controlled.

As described above, in the modification of second, the lateral forces are generated depending on the vehicle state quantity even when the rear wheels cannot be steered. Therefore, in the modified example of second, the center of gravity six-component exerted by the previously estimated forces is calculated, and the previously estimated forces are directly output to the forces that cannot be controlled while appropriately calculating the forces that can be controlled by subtracting the previously estimated forces from the original center of gravity six-component.

It should be noted that the modification of the second is applicable not to the case where the rear wheel steering actuator 44 is not provided but to the case where the front wheel steering actuator 43 is not provided. Further, the present disclosure is not limited to the case where the vehicle is not provided with the front wheel steering actuator 43 or the rear wheel steering actuator 44, and may be applied to the case where it is determined that the front wheel steering actuator 43 or the rear wheel steering actuator 44 cannot be used due to the necessity of abnormality detection or thermal protection.

Other Modification

The driver input recognition unit 11 does not necessarily obtain the longitudinal acceleration $A_x$, the front steering angle $\delta_f$, and the rear steering angle $\delta_r$ as the motion command corresponding to the driver input. The driver input recognition unit 11 may calculate only the longitudinal acceleration $A_x$ and the front steering angle $\delta_f$ as motion commands corresponding to the driver input, and may set rear steering angle $\delta_r=0$. Even if rear steering angle $\delta_r=0$, the vehicle can be driven in the approximate direction of travel.

The driver input recognition unit 11 may obtain the longitudinal accelerations $A_x$, curvature $\rho$, and sideslip angle $\beta$ as motion commands corresponding to the driver input. In this case, if the curvature $\rho$ and the sideslip angle $\beta$ are converted into the front steering angle $\delta_f$ and the rear steering angle $\delta_r$, the same calculation as in the above embodiment can be adopted. The driver input recognition unit 11 may obtain only the longitudinal acceleration $A_x$ and curvature $\rho$ as the motion command corresponding to the driver input. In this case, the same calculation as in the above embodiment can be adopted by determining the rear steering angle $\delta_r$ satisfying the curvature $\rho$ as the front steering angle $\delta_f=0$ or determining the front steering angle $\delta_f$ satisfying the curvature $\rho$ as the rear steering angle $\delta_r=0$.

The vehicle control actuator group 4 does not necessarily include an active stabilizer 45. The vehicle control actuator group 4 may include either the drive actuator 41 or the brake actuator 42, or either the front wheel steering actuator 43 or the rear wheel steering actuator 44.

The tire three-component calculation unit 13 does not necessarily determine the magnitude relationship between the number of control request "m" and the degrees of freedom "n" of the vehicle control actuator group. In the flowchart shown in FIG. 5, the vehicle control apparatus 100 may perform the processing of S20 and S30 without performing the determination processing of S18.

What is claimed is:

1. A vehicle control apparatus for performing vehicle control by a vehicle control actuator group based on a driver input, the apparatus comprising an electronic control unit (ECU) configured to:
   calculate a center of gravity six-component including a plane three-component and a three-component on spring as vehicle motion targets based on the driver input;
   calculate a tire three-component of each of four wheels of a vehicle based on the center of gravity six-component; and
   perform vehicle control by the vehicle control actuator group based on a tire three-component of at least one of the four wheels,
   wherein the ECU calculates the respective tire three-component for each of the four wheels from the center of gravity six-component by a coordinate transformation without repetition, which is a normalization with respect to driving stiffness of each respective wheel and cornering stiffness of each respective wheel, in response to determining that a number of control requests in the vehicle control is less than a number of degrees of freedom of the vehicle control actuator group, and
   the ECU calculates the respective tire three-component of each of the four wheels from the center of gravity six-component using a coefficient matrix determined from specifications of the vehicle and a least squares method in response to determining that the number of control requests in the vehicle control exceeds the degrees of freedom of the vehicle control actuator group.

2. The vehicle control apparatus according to claim 1, wherein the ECU calculates the plane three-component from the driver input by using a predetermined plane motion model, and calculates the center of gravity six-component by calculating the three-component on spring from the plane three-component by using a predetermined inertial motion model.

3. The vehicle control apparatus according to claim 1, wherein the ECU calculates the respective tire three-component of each of the four wheels from the center of gravity six-component using an inverse matrix of a coefficient matrix determined from specifications of the vehicle, when it is determined that the number of control requests in the vehicle control is the same as the number of degrees of freedom of the vehicle control actuator group.

4. The vehicle control apparatus according to claim 2, wherein the ECU calculates the respective tire three-component of each of the four wheels from the center of gravity six-component using an inverse matrix of a coefficient matrix determined from specifications of the vehicle, when it is determined that the number of control requests in the vehicle control is the same as the number of degrees of freedom of the vehicle control actuator group.

* * * * *